March 18, 1924.
H. A. LOWE
ADJUSTABLE SHANK FOR TEST INDICATORS
Filed March 31, 1919
1,486,908
Fig. 1.
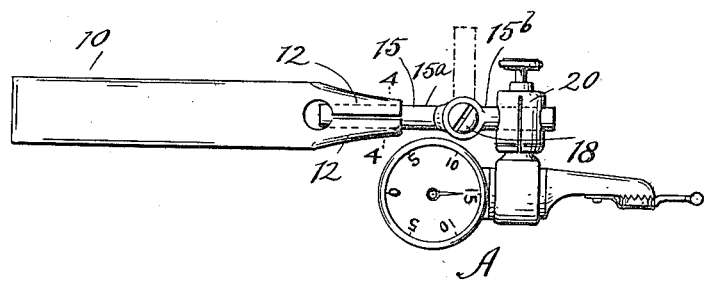
Fig. 2.
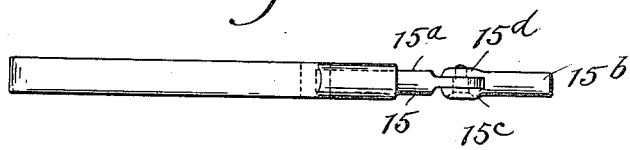
Fig. 4.
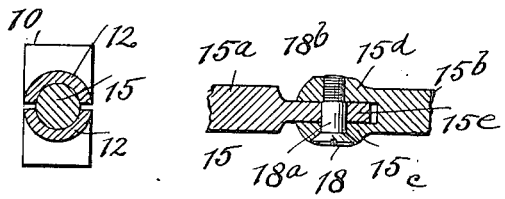
Fig. 3.
Inventor:
Henry A Lowe.
By Thurston Kwis & Hudson
attys.

Patented Mar. 18, 1924.

1,486,908

UNITED STATES PATENT OFFICE.

HENRY A. LOWE, OF CLEVELAND, OHIO.

ADJUSTABLE SHANK FOR TEST INDICATORS.

Application filed March 31, 1919. Serial No. 286,401.

*To all whom it may concern:*

Be it known that I, HENRY A. LOWE, a citizen of the United States, residing at Cleveland, in the county of Cuyahoga and State of Ohio, have invented a certain new and useful Improvement in Adjustable Shanks for Test Indicators, of which the following is a full, clear, and exact description.

Test indicators, such for example, as that shown and described in my prior Patent No. 1,144,367, granted June 29, 1915, are adapted for testing many kinds of parts which differ widely in shape and size. Such parts when being tested with a test indicator, are secured in some kind of a machine tool; and the test indicators are secured generally to the tool post of that machine tool. Because of the infinite variety of sizes and shapes of parts which may be tested, it is necessary that the indicator may be capable of occupying a multitude of different positions with respect, for example, to the tool post by which it is ultimately supported. The present invention is a connection between the tool post and a test indicator which is constructed in such wise that the test indicator may easily and quickly be placed in any position in which it may most effectively perform its functions.

The invention consists in the construction and combination of parts hereinafter described and pointed out definitely in the appended claims.

In the drawing, Fig. 1 is a side elevation, with the test indicator connected with it. Fig. 2 is a plan view of the shank and its extension; Fig. 3 is a sectional view of the friction joint between the two parts of the extension, and Fig. 4 is a sectional end view in the plane of line 4—4 of Fig. 1.

Referring to the parts by reference characters, 10 represents a shank which may be of rectangular form whereby it is adapted for connection with the ordinary tool post of any machine tool. 15 represents a jointed shank extension which is intermediate of this shank and the test indicator A. This extension is made of two cylindrical parts 15$^a$, 15$^b$, of like diameter, but of different lengths.

The end of one of these parts is flattened and slotted forming two ears 15$^c$, 15$^d$, and the end of the other part is flattened and inserted between said two ears. This flattened end 15$^e$ is pivoted upon the unthreaded part 18$^a$ of a screw 18, which passes through a hole in one ear and screws into the other ear, and thereby clamping the parts 15$^e$ tight enough for practical purposes.

This extension 15 is swivelled in the end of the shank. That is to say, one part or the other of the extension is fitted friction tight in a longitudinal cylindrical recess between two spring jaws 12 at the end of the shank. In that event the jaws 12 will grip the inserted part friction tight and hold it against accidental displacement. The part which is not so inserted between the spring jaws 12 will be the part to which the indicator is attached by means of a nut 20. The nut has a transverse hole in which either of the shanks 15$^a$, 15$^b$, may be rotatably fitted; and carries a set screw 25 by which to immovably fix the nut upon the shank. It is obvious that the instrument may be made to assume a multitude of positions relative to the shank. To do this one may swivel or turn the extension entirely around in the spring jaws, said extension turning about the axis of the part between said jaws. He may turn the other arm of the extension upon its pivot through almost an entire circle. For many reasons it may be desired to have the short arm 15$^b$ grasped by the spring jaws and have the instrument attached to the long arm 15$^a$, or vice versa, and obviously this is easy of accomplishment, because either arm may be swivelled between the jaws 12 of the shank.

Having described my invention, I claim:—

1. In a device for connecting a test indicator with the tool post of a machine, the combination of a shank having at one end a pair of spring clamping jaws between which is a longitudinal cylindrical recess, a shank extension comprising two arms which are of cylindrical form and are of like diameter and are pivoted together, one of said two arms being fitted friction tight in the cylindrical recess between said jaws, a nut which is rotatably fitted upon the other arm and is adapted to be connected with the test indicator, and means to prevent the rotation of said nut upon said arm.

2. In a device for connecting a test indicator with the tool post of a machine, the combination of a shank having at one end a pair of spring clamping jaws between which is a longitudinal cylindrical recess, a shank extension comprising two arms which are of cylindrical form and are of like diameter but of unequal length and are pivoted together, one of said two arms being fitted friction tight in the cylindrical recess between said jaws, a device constructed for attachment with the test indicator, which device is rotatably fitted upon the other arm of said shank extension, and is provided with means for preventing said rotation while permitting angular adjustment.

3. In a device for connecting a test indicator with the tool post of a machine, the combination of a shank having at one end a pair of spring clamping jaws between which is a longitudinal recess, a shank extension comprising two arms which are of cylindrical form and are pivoted together, one of said two arms being fitted friction tight in the recess between the jaws, and a device constructed for attachment with the test indicator, which device is rotatably clamped upon the other arm of said shank extension.

In testimony whereof, I hereunto affix my signature.

HENRY A. LOWE.